United States Patent

Ito

(10) Patent No.: US 9,705,208 B2
(45) Date of Patent: Jul. 11, 2017

(54) ANTENNA DEVICE AND ELECTRONIC APPLIANCE

(71) Applicant: Murata Manufacturing Co., Ltd., Nagaokakyo-shi, Kyoto-fu (JP)

(72) Inventor: Hiromitsu Ito, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 199 days.

(21) Appl. No.: 14/803,261

(22) Filed: Jul. 20, 2015

(65) Prior Publication Data

US 2015/0325918 A1 Nov. 12, 2015

Related U.S. Application Data

(63) Continuation of application No. PCT/JP2014/083828, filed on Dec. 22, 2014.

(30) Foreign Application Priority Data

Dec. 26, 2013 (JP) .................................. 2013-269923
Jul. 9, 2014 (JP) .................................. 2014-140995

(51) Int. Cl.
  *H01Q 7/00* (2006.01)
  *H01Q 1/24* (2006.01)
  (Continued)

(52) U.S. Cl.
  CPC ............... *H01Q 21/29* (2013.01); *H01Q 1/24* (2013.01); *H01Q 1/243* (2013.01); *H01Q 1/50* (2013.01);
  (Continued)

(58) Field of Classification Search
  CPC ........ H01Q 21/29; H01Q 21/24; H01Q 1/243; H01Q 1/521; H01Q 21/28; H01Q 21/06;
  (Continued)

(56) References Cited

U.S. PATENT DOCUMENTS

2006/0151619 A1 7/2006 Ninomiya et al.
2010/0053014 A1* 3/2010 Yosui ....................... H01Q 1/20
343/787

(Continued)

FOREIGN PATENT DOCUMENTS

JP 2000-183632 A 6/2000
JP 2011-127368 A 6/2011
(Continued)

OTHER PUBLICATIONS

Official Communication issued in International Patent Application No. PCT/JP2014/083828, mailed on Mar. 10, 2015.
(Continued)

*Primary Examiner* — Dieu H Duong
*Assistant Examiner* — Michael Bouizza
(74) *Attorney, Agent, or Firm* — Keating & Bennett, LLP

(57) ABSTRACT

An antenna device includes coil antennas each including a coil conductor wound around a winding axis and a planar conductor that includes at least one edge and that is superposed with at least a portion of each of the coil antennas when viewed in plan. Winding axes of the plurality of coil antennas are parallel or substantially parallel to each other and so as to extend along a surface of the planar conductor, first coil opening ends of coil openings of the coil antennas in a direction in which the winding axes extend are contiguous with the edge and the coil antennas are connected such that magnetic fields generated by the coil antennas are in phase with each other. When W represents a width of the planar conductor, A represents a central spacing of the coil antennas and B represents a distance from a center of a coil antenna to a side of the planar conductor, $A \leq (3/10)W$.

20 Claims, 25 Drawing Sheets

(51) Int. Cl.
*H01Q 21/00* (2006.01)
*H01Q 7/06* (2006.01)
*H01Q 21/29* (2006.01)
*H01Q 1/50* (2006.01)
*H01Q 1/52* (2006.01)
*H01Q 21/06* (2006.01)
*H01Q 21/24* (2006.01)
*H01Q 21/28* (2006.01)
*H04M 1/02* (2006.01)

(52) U.S. Cl.
CPC .............. *H01Q 1/521* (2013.01); *H01Q 7/00* (2013.01); *H01Q 7/06* (2013.01); *H01Q 21/0006* (2013.01); *H01Q 21/06* (2013.01); *H01Q 21/24* (2013.01); *H01Q 21/28* (2013.01); *H04M 1/026* (2013.01); *H04M 2250/04* (2013.01)

(58) Field of Classification Search
CPC ........ H01Q 1/24; H01Q 21/0006; H01Q 7/06; H01Q 1/50; H01Q 7/00; H04M 1/026; H04M 2250/04
See application file for complete search history.

(56) References Cited

U.S. PATENT DOCUMENTS

| 2010/0321267 A1* | 12/2010 | Ito | H01Q 7/08 343/788 |
| 2012/0176283 A1* | 7/2012 | Yosui | G06K 19/07779 343/702 |
| 2013/0229319 A1* | 9/2013 | Miura | H01Q 7/06 343/788 |
| 2014/0198011 A1* | 7/2014 | Tsubaki | H01Q 7/06 343/867 |

FOREIGN PATENT DOCUMENTS

| JP | 2011-147104 A | 7/2011 |
| JP | 2012-029258 A | 2/2012 |
| WO | 2005/053095 A1 | 6/2005 |
| WO | 2011/055702 A1 | 5/2011 |

OTHER PUBLICATIONS

Official Communication issued in Japanese Patent Application No. 2015-520453, mailed on Jun. 9, 2015.

* cited by examiner

FIG. 4A
FIG. 4B
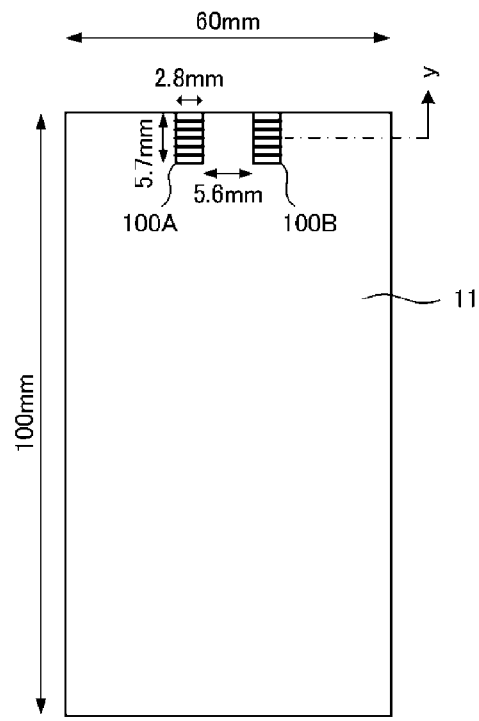
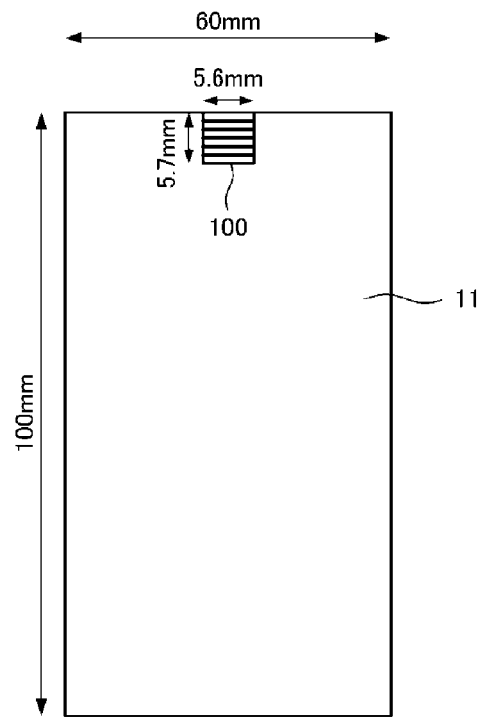
FIG. 5
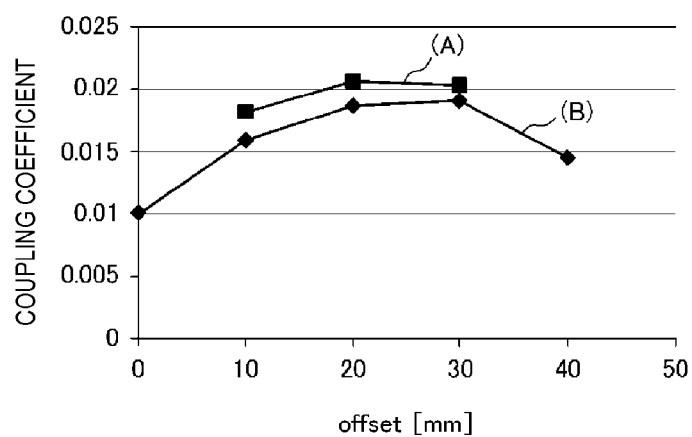

FIG. 24A
FIG. 24B
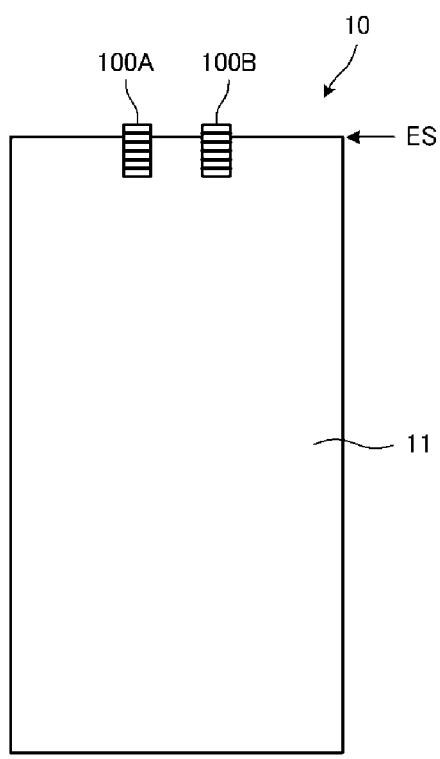
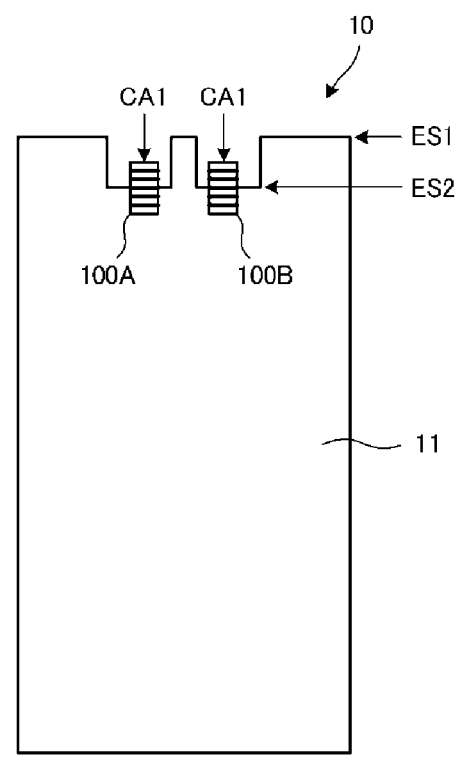

ANTENNA DEVICE AND ELECTRONIC APPLIANCE

BACKGROUND OF THE INVENTION

1. Field of the Invention

The present invention relates to an antenna device preferably use in a HF band communication system, for example, and to an electronic appliance.

2. Description of the Related Art

A technology of providing a communication terminal device such as a cellular phone terminal with an RFID function is, for example, disclosed in Japanese Unexamined Patent Application Publication No. 2012-029258. In Japanese Unexamined Patent Application Publication No. 2012-029258, an antenna device is disclosed that includes an antenna, which has a coil portion, and a metal member arranged close to the antenna, an opening portion of the coil portion of the antenna being arranged at an end portion of the metal member.

In a system utilizing a HF band as a communication frequency, the range of communication between antenna devices depends on the magnetic flux passing through the coil antennas. That is, in order to secure a certain communication range between antenna devices, it is necessary to make the size of the coil antennas large but making the size of the coil antennas large impedes the size reduction of electronic appliances such as communication terminal devices.

In the antenna device described in Japanese Unexamined Patent Application Publication No. 2012-029258, an antenna is arranged in which a coil opening portion extends across an end portion of a metal member and therefore there is a tendency for the volume of the antenna to be large and for an electronic appliance to be increased in size. On the other hand, if size reduction of the electronic appliance is a priority and the volume of the volume of the antenna is made small, coupling with the antenna on the communication partner side is weakened.

SUMMARY OF THE INVENTION

Preferred embodiments of the present invention provide an antenna device that occupies a small area while still securing a certain communication range and also provide a small-sized electronic appliance.

An antenna device according to a preferred embodiment of the present invention includes a plurality of coil antennas each including a coil conductor wound around a winding axis and a planar conductor that includes at least one edge and that is superposed with at least a portion of each of the coil antennas when viewed in plan. Winding axes of the plurality of coil antennas are arranged so as to be parallel or substantially parallel to each other and so as to extend along a surface of the planar conductor, first coil opening ends of coil openings of the coil antennas in a direction in which the winding axes extend are contiguous with the edge, and the coil antennas are connected such that magnetic fluxes generated by the coil antennas are in phase with each other. When W represents a width of the planar conductor at a line that passes along second coil opening ends of the plurality of coil antennas on the opposite side to the first coil opening ends and extends in a direction perpendicular or substantially perpendicular to the winding axes, A represents a central spacing of adjacent coil antennas among the plurality of coil antennas and B represents a distance from a center of a coil antenna at one end in a direction in which the plurality of coil antennas are arranged to a side of the planar conductor along the line, A<(3/10)W and A<B.

An electronic appliance according to a preferred embodiment of the present invention includes the antenna device, and the coil antennas and the planar conductor are provided inside a casing.

According to various preferred embodiments of the present invention, an antenna device is reduced in size while the coupling coefficient with a communication-partner-side antenna remains the same, and the coupling coefficient with the communication-partner-side antenna is increased while the antenna volume remains the same.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A and FIG. 4B are plan views of an antenna device for confirming a characteristics improvement effect due to provision of two coil antennas.

FIG. 5 illustrates a characteristics improvement effect due to the provision of two coil antennas.

FIG. 24A and FIG. 24B illustrate examples in which coil antennas 100A and 100B protrude from an edge (edge of planar conductor 11) ES of a substrate 10 on which the planar conductor 11 is provided.

DETAILED DESCRIPTION OF THE PREFERRED EMBODIMENTS

Figure 1:
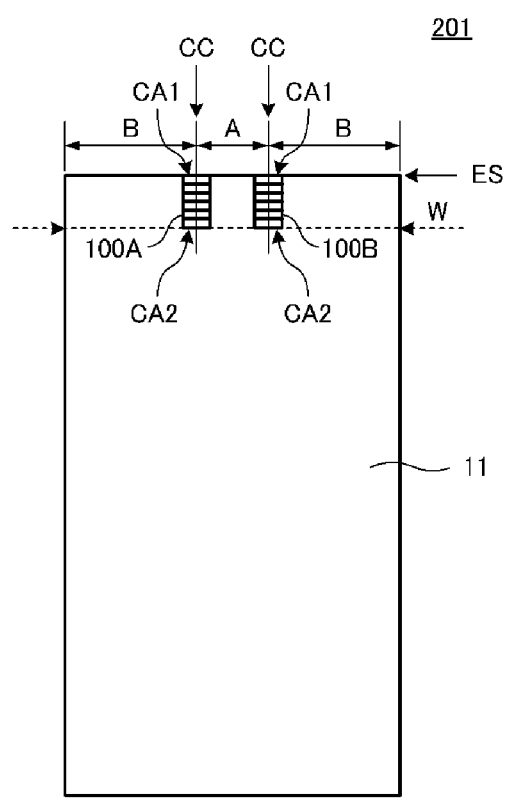
FIG. 1 is a plan view of an antenna device 201 according to a first preferred embodiment of the present invention.

Hereafter, preferred embodiments of the present invention will be described by giving a number of specific examples while referring to the drawings. Like symbols denote like portions in the drawings. Each preferred embodiment is an illustrative example and elements and portions of the configurations illustrated in the different preferred embodiments may be substituted or combined with each other.

Antenna devices and communication terminal devices of each of the following preferred embodiments are preferably included in or used in a HF band RFID system such as near field communication (NFC), for example.

First Preferred Embodiment

FIG. 1 is a plan view of an antenna device 201 according to a first preferred embodiment of the present invention.

The antenna device 201, as illustrated in FIG. 1, includes a planar conductor 11 including at least one edge ES and two coil antennas 100A and 100B. As will be described later, the coil antennas 100A and 100B each include a coil conductor that is wound around a winding axis CC. The coil antennas 100A and 100B each include a first coil opening end CA1 and a second coil opening end CA2.

As used herein "planar conductor" indicates not only a conductor that is completely planar or flat, but also a conductor that is substantially planar or mostly flat (i.e., within manufacturing tolerances or including slight variations in flatness) as would have been understood by persons of skill in the art.

The winding axes CC of the coil antennas 100A and 100B are parallel or substantially parallel to each other, the first coil opening ends CA1 of the coil antennas 100A and 100B are contiguous with the edge ES and the winding axes CC are arranged so as to extend along a surface of the planar conductor 11. The coil antennas 100A and 100B are electrically connected such that magnetic flux generated by the coil antenna 100A and magnetic flux generated by the coil antenna 100B are in phase with each other in a direction from the inside to the outside with the edge ES of the planar conductor 11 defining and functioning as a boundary.

The planar conductor 11 includes a metal foil such as one composed of Cu, Ag or Al and is provided on a rigid resin substrate such as one composed of epoxy resin.

Figure 2:
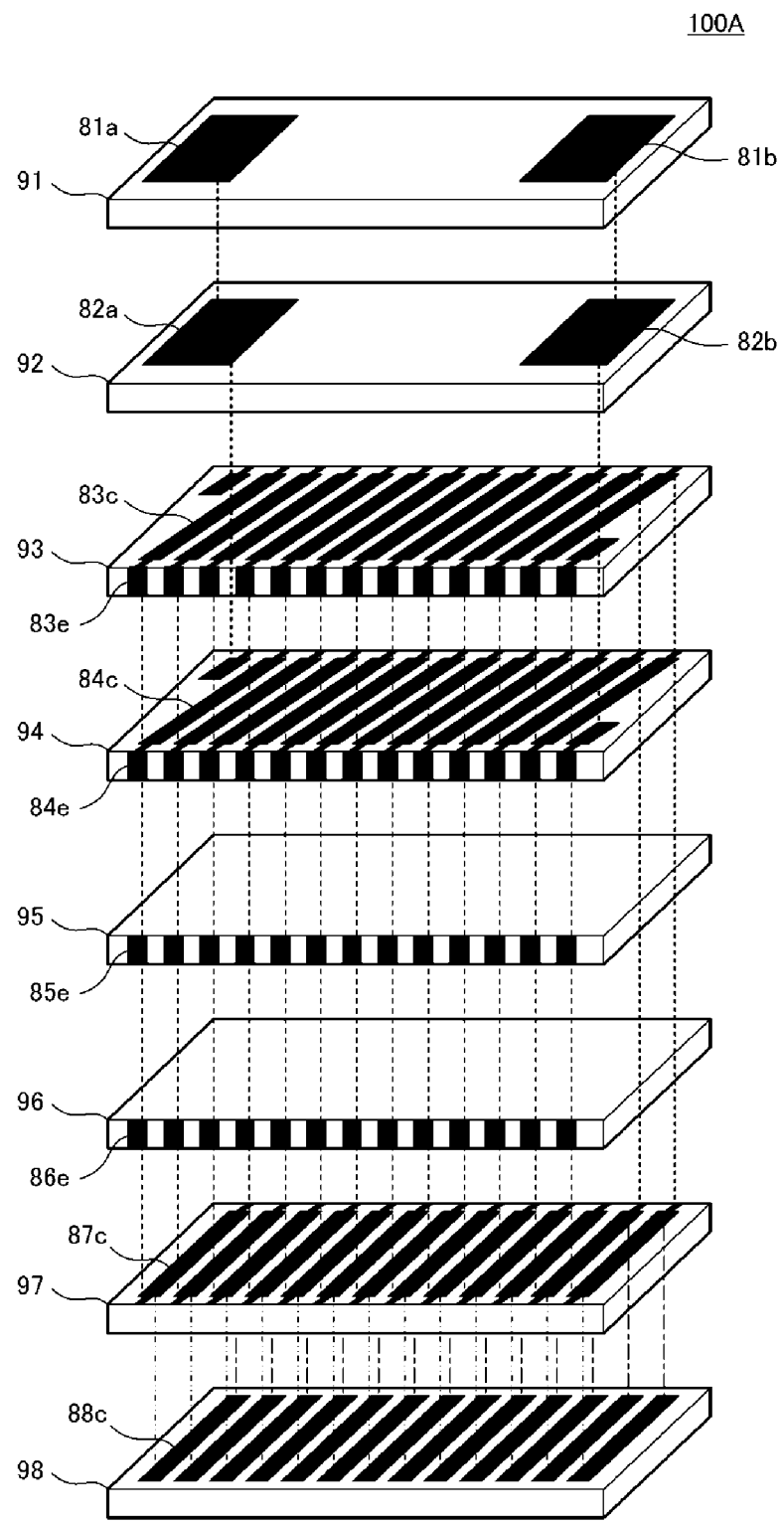
FIG. 2 is an exploded perspective view of a coil antenna 100A.

FIG. 2 is an exploded perspective view of the coil antenna 100A. The coil antenna 100B is preferably the same or substantially the same as the coil antenna 100A and therefore the coil antenna 100A will be described here. The coil antenna 100A includes a multilayer body including substrate layers 91 to 98. The substrate layers 91, 92, 93, 97 and 98 are non-magnetic layers such as non-magnetic ferrite layers and the substrate layers 94, 95 and 96 are magnetic layers such as magnetic ferrite layers.

Terminal electrodes 81a, 81b, 82a and 82b are provided on the substrate layers 91 and 92. The terminal electrodes 81a and 82a are connected to each other through a via electrode (interlayer connection conductor) and the terminal electrodes 81b and 82b are connected to each other through a via electrode. Line-shaped electrodes (in-plane coil conductors) 83c are provided on one surface of the substrate layer 93 and line-shaped electrodes 84c are provided on one surface of the substrate layer 94. Side-surface electrodes (side surface coil conductors) 83e and 84e are provided on both side surfaces of the substrate layers 93 and 94. The line-shaped electrode 83c and 84c are connected in parallel with each other through via electrodes. End portions of the line-shaped electrodes 83c and 84c on both sides on the outer side are connected to the terminal electrodes 82a and 82b through via electrodes. Side-surface electrodes 85e and 86e are provided on the two side surfaces of the substrate layers 95 and 96. Line-shaped electrodes 87c are provided on one surface of the substrate layer 97 and line-shaped electrodes 88c are provided on one surface of the substrate layer 98. The line-shaped electrode 87c and 88c are connected in parallel with each other through via electrodes.

The line-shaped electrodes 83c and 84c are connected in parallel with each other and the line-shaped electrodes 87c and 88c are connected in parallel with each other and consequently the direct-current resistance of the coil is reduced. In addition, the line-shaped electrodes 83c, 84c, 87c and 88c extend over an outer periphery of magnetic layers and the side-surface electrodes 83e, 84e, 85e and 86e extend over side surfaces of the multilayer body and as a result the coil opening is made large and confinement of magnetic flux is reduced.

Figure 3A:
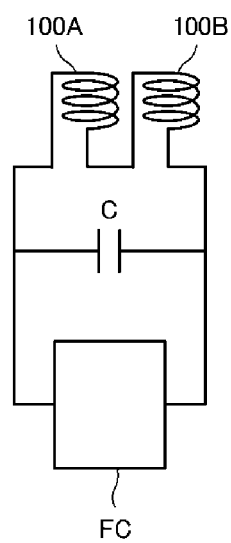
FIG. 3A and FIG. 3B are circuit diagrams illustrating examples of the form of a connection between two coil antennas.
Figure 3B:
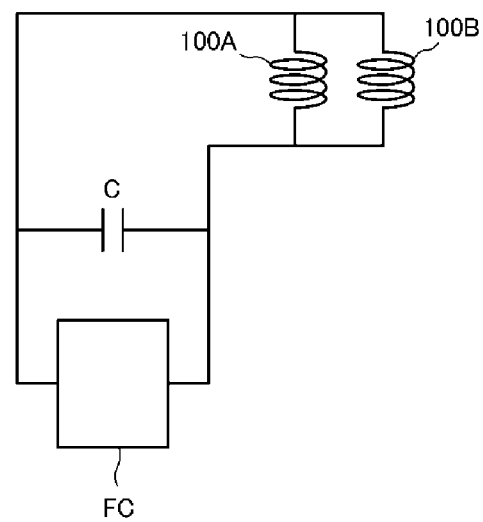

FIGS. 3A and 3B show circuit diagrams illustrating examples of the form of a connection between the two coil antennas. The two coil antennas 100A and 100B are connected in series in FIG. 3A and are connected in parallel in FIG. 3B. A feeder circuit FC is an RFIC, for example. A reactance element such as a capacitor C to perform impedance matching and resonant frequency setting of the coil antennas 100A and 100B is including in the feeder circuit as necessary.

When coil conductors of a plurality of coil antennas are connected in series with a feeder circuit, inductance values of the coil antennas are increased. Furthermore, when coil conductors of a plurality of coil antennas are connected in parallel with a feeder circuit, loss is reduced (Q value is improved).

FIGS. 4A and 4B and FIGS. 5A and 5B illustrate a characteristics improvement effect due to the provision of two coil antennas. FIG. 4A is a plan view of the antenna device of this preferred embodiment with dimensions inserted thereinto and FIG. 4B is a plan view of an antenna device of a target of comparison with a single coil antenna 100 being mounted. A planar surface area of the coil antenna 100 and a total planar surface area of the two coil antennas 100A and 100B are equal or substantially equal to each other.

FIGS. 5A and 5B illustrate coupling coefficients between the antenna devices illustrated in FIGS. 4A and 4B and a communication-partner-side antenna. The vertical axis represents the coupling coefficient and the horizontal axis represents the size of an offset in a y-axis direction (refer to FIGS. 4A and 4B). Characteristics in FIG. 5A are the characteristics of the antenna device illustrated in FIG. 4A and characteristics in FIG. 5B are the characteristics of the antenna device illustrated in FIG. 4B. The communication-partner-side antenna preferably is a φ 70 mm loop antenna. The offset is the shift in the y axis direction with respect to the center of the communication-partner-side antenna.

As is clear from the results illustrated in FIGS. 5A and 5B, a higher degree of coupling is obtained when the coil antenna is divided into a plurality of coil antennas if the total planar surface area of the coil antennas remains the same.

Figure 6A:
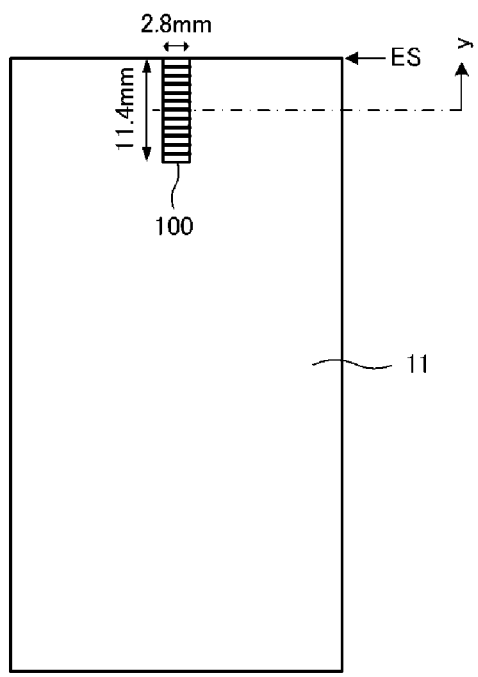
FIG. 6A and FIG. 6B are plan views of an antenna device for confirming differences in antenna characteristics due to a difference in aspect ratio between coil antennas.
Figure 6B:
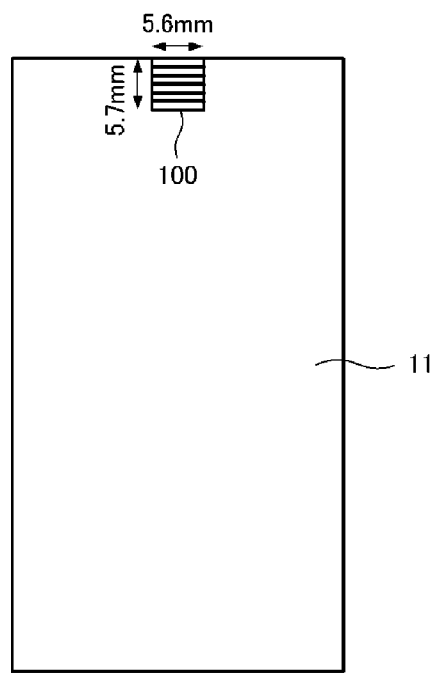

FIGS. 6A and 6B and FIGS. 7A and 7B illustrate differences in antenna characteristics due to a difference in aspect ratio between coil antennas. FIGS. 6A and 6B are plan views of a state in which a single coil antenna is provided for comparison. The coil antennas 100 of FIGS. 6A and 6B have the same planar surface area but different aspect ratios.

Figure 7:
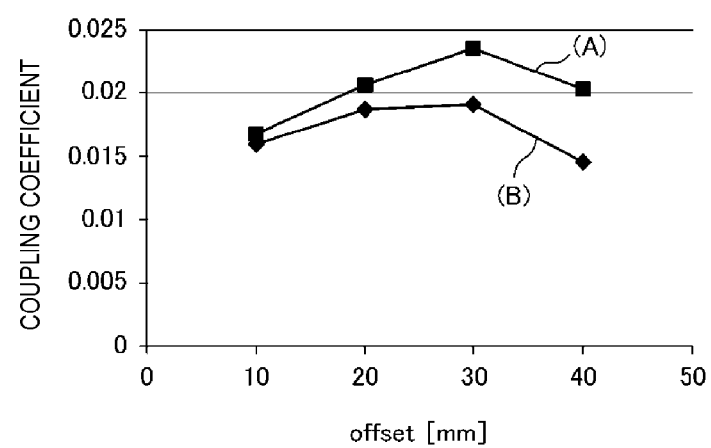
FIG. 7 illustrates differences in antenna characteristics due to a difference in aspect ratio between coil antennas.

FIGS. 7A and 7B illustrate coupling coefficients between the antenna devices illustrated in FIGS. 6A and 6B and a communication-partner-side antenna. The vertical axis represents the coupling coefficient and the horizontal axis represents the size of an offset in a y-axis direction. Characteristics in FIG. 7A are the characteristics of the antenna device illustrated in FIG. 6A and characteristics in FIG. 7B are the characteristics of the antenna device illustrated in FIG. 6B.

As is clear from the results illustrated in FIGS. 7A and 7B, when the total planar surface areas of the coil antennas is the same, if the length (width) of the coil antenna in a direction along the edge ES is smaller than the length in a direction perpendicular or substantially perpendicular to the edge ES, that is, a vertical length illustrated in FIG. 6, magnetic flux more easily passes through the coil antenna 100 and a high degree of coupling is obtained. The same trend also occurs in the case where a plurality of coil antennas are used.

Figure 8A:
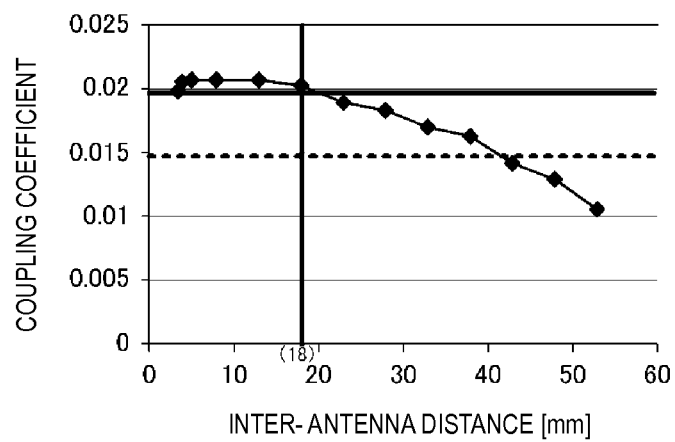
FIG. 8A and FIG. 8B illustrate changes in antenna characteristics that occur when the arrangement positions of two coil antennas 100A and 100B with respect to a planar conductor 11 illustrated in FIG. 1 are changed.
Figure 8B:
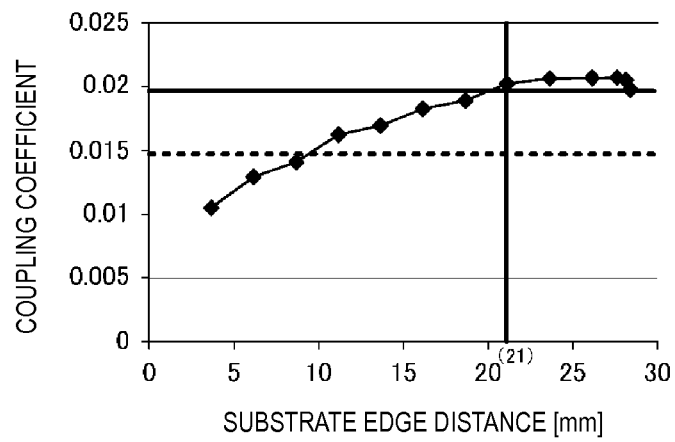

FIGS. 8A and 8B illustrate antenna characteristics when the arrangement positions of the two coil antennas 100A and 100B with respect to the planar conductor 11 illustrated in FIG. 1 are changed. W represents the width of the planar conductor 11 at a line passing along the second coil opening ends CA2 of the coil antennas 100A and 100B, A represents a central spacing (hereafter, "inter-antenna distance") of the two coil antennas 100A and 100B and B represents a distance (hereafter, "substrate edge distance") from the center of each of the coil antennas 100A and 100B to the side (end) of the planar conductor along the line.

FIG. 8A illustrates the relationship between the coupling coefficient and the inter-antenna distance A and FIG. 8B illustrates the relationship between the coupling coefficient and the substrate edge distance B. These coupling coefficients are coupling coefficients between the antenna device and the communication-partner-side antenna when the width W of the planar conductor 11 is about 60 mm, for example. In FIGS. 8A and 8B, a solid horizontal line is a line representing the coupling coefficient of an antenna device in which a single coil antenna is mounted having a planar surface area equal to the total planar surface area of the coil antennas 100A and 100B and a broken horizontal line is a line representing the coupling coefficient of an antenna device in which a single coil antenna the same as the coil antenna 100A or 100B is mounted.

As illustrated in FIGS. 8A and 8B, a state in which the two coil antennas 100A and 100B are closest to each other (state in which substrate edge distance B is largest) corresponds to a case in which a single coil antenna having twice the planar surface area is provided, and as the inter-antenna distance A becomes larger from this state, the coupling coefficient becomes larger, and as the inter-antenna distance A becomes even larger (as substrate edge distance B becomes smaller) the coupling coefficient reaches a peak and then exhibits a decreasing trend. When the inter-antenna distance A preferably is around 18 mm or less, for example, a higher coupling coefficient is obtained than with an antenna device provided with a coil antenna having twice the planar surface area. That is, it is preferable that the inter-antenna distance A be about (3/10)W or less. Furthermore, when the substrate edge distance B is around 21 mm or more, for example, a higher coupling coefficient is obtained than with an antenna device provided with a coil antenna having twice the planar surface area. That is, it is preferable that the substrate edge distance B be about (W−A(N−1))/2 or more, for example. Here, N is the number of coil antennas and N=2 in this preferred embodiment, for example.

Figure 9:
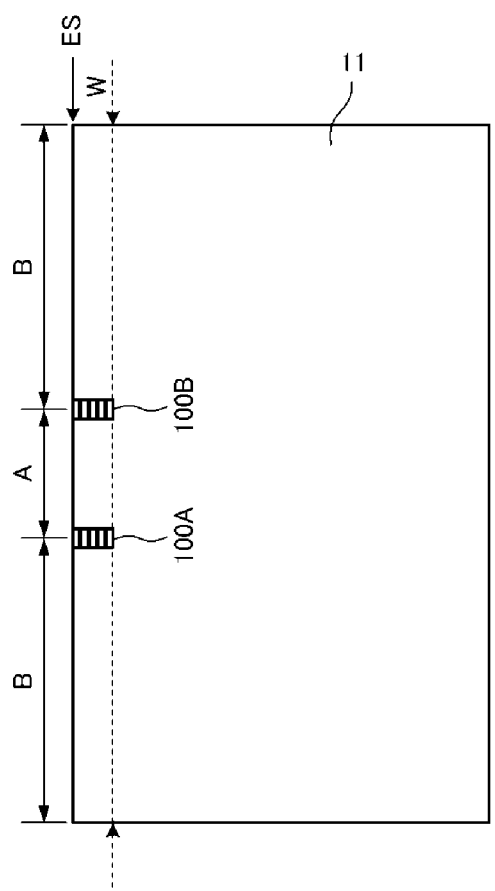
FIG. 9 is a plan view of an antenna device in which the shape of a planar conductor 11 differs from that illustrated in FIG. 1.

FIG. 9 is a plan view of an antenna device in which the shape of the planar conductor 11 differs from that illustrated in FIG. 1. In this example, the two coil antennas 100A and 100B are arranged such that their first coil opening ends are contiguous with an edge ES, which is a long edge of the planar conductor 11. A width W of the planar conductor at a line passing along second coil opening ends of the coil antennas 100A and 100B is about 100 mm, for example.

Figure 10A:
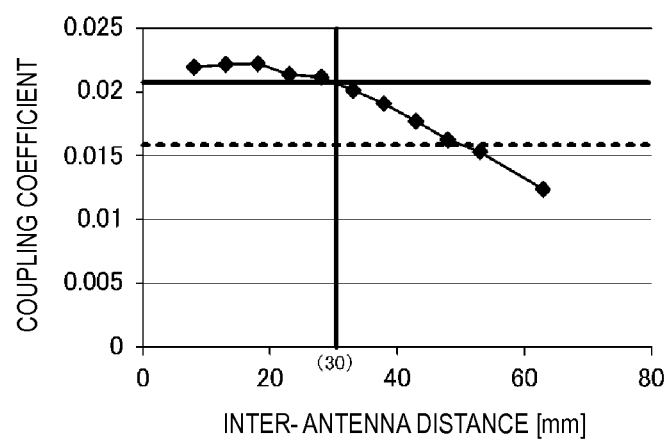
FIG. 10A and FIG. 10B illustrate changes in antenna characteristics that occur when the arrangement positions of two coil antennas 100A and 100B with respect to a planar conductor 11 illustrated in FIG. 9 are changed.
Figure 10B:
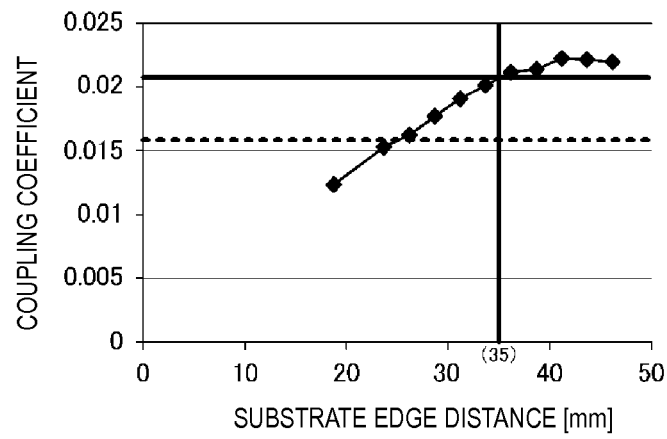

FIGS. 10A and 10B illustrate antenna characteristics when the arrangement positions of the two coil antennas 100A and 100B with respect to the planar conductor 11 illustrated in FIG. 9 are changed.

FIG. 10A illustrates the relationship between the coupling coefficient and the inter-antenna distance A and FIG. 10B illustrates the relationship between the coupling coefficient and the substrate edge distance B. In FIGS. 10A and 10B, a solid horizontal line is a line representing the coupling coefficient of an antenna device in which a single coil antenna is mounted having a planar surface area equal or substantially equal to the total planar surface area of the coil antennas 100A and 100B and a broken horizontal line is a line representing the coupling coefficient of an antenna device in which a single coil antenna the same as the coil antenna 100A or 100B is mounted.

As illustrated in FIG. 10A, when the inter-antenna distance A is around 30 mm or less, for example, a higher coupling coefficient is obtained than with an antenna device provided with a coil antenna having twice the planar surface area. Furthermore, as illustrated in FIG. 10B, when the substrate edge distance B is around 35 mm or more, for example, a higher coupling coefficient is obtained than with an antenna device provided with a coil antenna having twice the planar surface area. That is, it is preferable that the inter-antenna distance A be about $(3/10)W$ or less, for example. In addition, it is preferable that the substrate edge distance B be about $(W-A(N-1))/2$ or more, for example.

Figure 11:
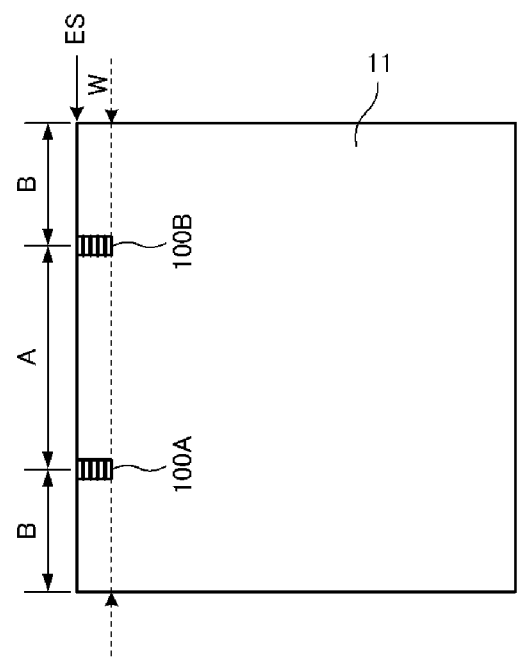
FIG. 11 is a plan view of an antenna device in which the shape of a planar conductor 11 differs from that illustrated in FIG. 1.

FIG. 11 is a plan view of an antenna device in which the shape of the planar conductor 11 differs from that illustrated in FIG. 1. In this example, the width W of the planar conductor preferably is about 80 mm, for example.

Figure 12A:
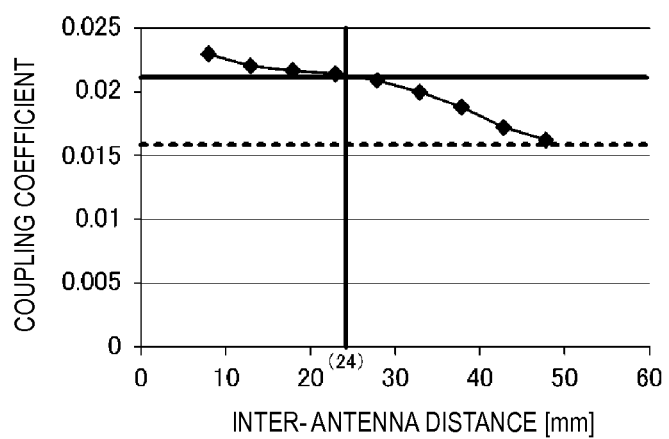
FIG. 12A and FIG. 12B illustrate changes in antenna characteristics that occur when the arrangement positions of two coil antennas 100A and 100B with respect to a planar conductor 11 illustrated in FIG. 11 are changed.
Figure 12B:
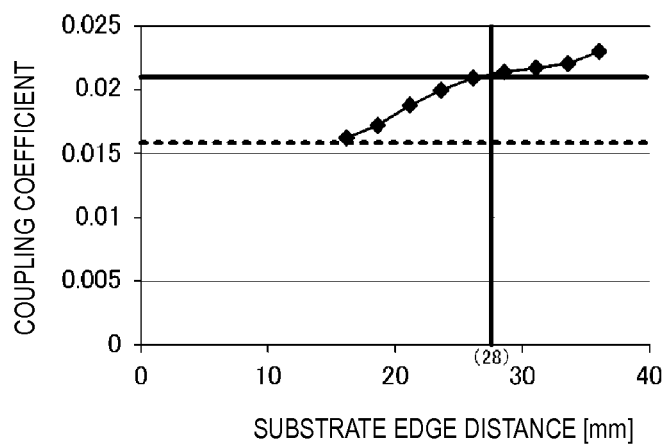

FIGS. 12A and 12B illustrates antenna characteristics when the arrangement positions of the two coil antennas 100A and 100B with respect to the planar conductor 11 illustrated in FIG. 11 are changed.

FIG. 12A illustrates the relationship between the coupling coefficient and the inter-antenna distance A and FIG. 12B illustrates the relationship between the coupling coefficient and the substrate edge distance B. In FIGS. 12A and 12B, a solid horizontal line is a line representing the coupling coefficient of an antenna device in which a single coil antenna is mounted having a planar surface area equal or substantially equal to the total planar surface area of the coil antennas 100A and 100B and a broken horizontal line is a line representing the coupling coefficient of an antenna device in which a single coil antenna the same as the coil antenna 100A or 100B is mounted.

As illustrated in FIG. 12A, when the inter-antenna distance A is around 24 mm or less, for example, a higher coupling coefficient is obtained than with an antenna device provided with a coil antenna having twice the planar surface area. Furthermore, as illustrated in FIG. 12B, when the substrate edge distance B is around 28 mm or more, for example, a higher coupling coefficient is obtained than with an antenna device provided with a coil antenna having twice the planar surface area. That is, it is preferable that the inter-antenna distance A be about $(3/10)W$ or less, for example. In addition, it is preferable that the substrate edge distance B be about $(W-A(N-1))/2$ or more, for example.

As in the number of examples described above, when $A \le (3/10)W$, an effect is obtained due to the coil antennas 100A and 100B being adjacent to each other. In addition, by making $(W-A(N-1))/2 \le B \le W$, extending portions of the planar conductor that extend from the coil antennas 100A and 100B to edges of the planar conductor contribute to a magnetism collection effect for magnetic flux from the communication-partner-side antenna and a radiation effect for magnetic flux from the coil antennas. Therefore, by arranging the coil antennas 100A and 100B using the relationships $A \le (3/10)W$ and $(W-A(N-1))/2 \le B \le W$, coupling with the communication-partner-side antenna is strong while the total volume of the coil antennas is small.

It is preferable that the winding axes CC of the coil antennas 100A and 100B be parallel or substantially parallel to the planar conductor 11. This is because, if the winding axes CC were perpendicular or substantially perpendicular to the planar conductor 11, the majority of magnetic flux that the coil antennas 100A and 100B generate will be neutralized by an induced current flowing in the planar conductor 11 and the amount of magnetic flux generated by the antenna device will be reduced. The term "parallel or substantially parallel" means within ±45°.

Furthermore, the winding axes CC of the coil antennas 100A and 100B are preferably perpendicular or substantially perpendicular to the edge ES of the planar conductor 11. As a result of the edge (edge end portion) of the planar conductor 11 being perpendicular or substantially perpendicular to the winding axes, the coil antennas strongly couple with the edge end portion of the planar conductor 11 and therefore the capability of the planar conductor 11 to contribute to the magnetism collection effect and radiation effect of the antenna device is improved. The term "perpendicular or substantially perpendicular" means within ±45°.

Improvement of the antenna characteristics due to the coil antennas being close to each other is explained by the following reason.

Among magnetic flux generated by the coil antennas, there is magnetic flux that is linked with the communication-partner-side antenna and magnetic flux that is not linked with the communication-partner-side antenna (leakage magnetic flux). The higher the proportion of magnetic flux that is linked with the communication-partner-side antenna out of the magnetic flux generated by the coil antennas, the higher the coupling coefficient.

Figure 13A:
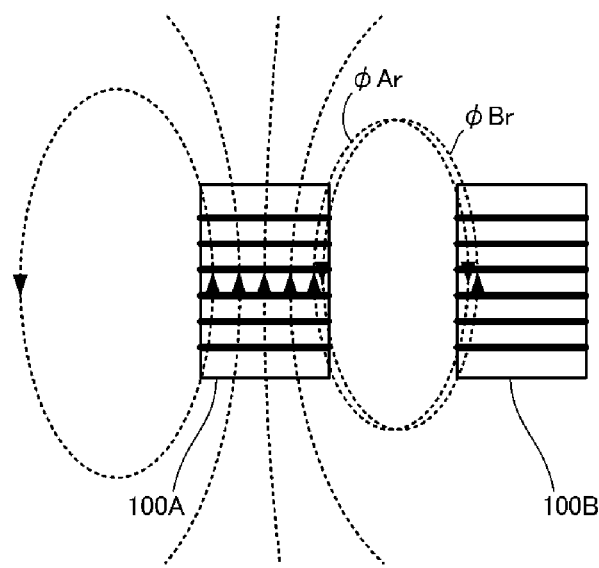
FIG. 13A and FIG. 13B are conceptual diagrams illustrating the state of magnetic flux resulting from the spacing of two coil antennas.
Figure 13B:
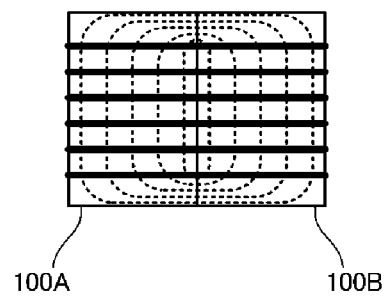

Here, conceptual views of the state of magnetic flux resulting from the spacing of the two coil antennas are illustrated in FIGS. 13A and 13B. As illustrated in FIG. 13A, the two coil antennas 100A and 100B are close to each other and as a result leakage magnetic flux φAr generated by one coil antenna 100A links with the other coil antenna 100B and is canceled out by leakage flux φBr generated by the other coil antenna 100B. At this time, the combined amount of magnetic flux generated by the two coil antennas 100A and 100B is reduced. However, the flux that is canceled out is leakage magnetic flux and the amount of magnetic flux linked with the communication-partner-side antenna does not change. Therefore, there is no reduction in the coupling coefficient due to linking of the magnetic flux of the two coil antennas 100A and 100B. In other words, an effect of the coupling coefficient being improved is obtained as a result of the two coil antennas 100A and 100B being close to each other and the antenna characteristics are improved due to this effect.

In particular, when a plurality of coil antennas are arranged on a planar conductor for the sake of the magnetism collection effect in which magnetic flux collects on a coil antenna and the radiation effect in which magnetic flux is radiated from a coil antenna as in this preferred embodiment, provided that $A \le (3/10)W$ and $(W-A(N-1))/2 \le B \le W$, the magnetism collection effect and radiation effect are obtained along with the effect due to the coil antennas being close to each other described above. In this case, the antenna characteristics are improved compared with those of one coil antenna having the same total planar surface area.

However, as illustrated in FIG. 8A, for example, if the two coil antennas are too close to each other, the coupling coefficient will instead decrease and the antenna characteristics may be degraded. This is because when the two coil antennas are too close together, even magnetic flux that is linked with the communication-partner-side antenna generated by one of the coil antennas also links with the other coil antenna and is canceled out. That is, the amount of magnetic flux linking with the communication-partner-side antenna is reduced and therefore the coupling coefficient is reduced and the antenna characteristics are degraded. In particular, in the case where the two coil antennas 100A and 100B contain a magnetic substance, as illustrated in FIG. 13B, almost all the magnetic flux generated by one coil antenna 100A defines magnetic paths only within a magnetic substance including the magnetic substance of the other coil antenna 100B. Therefore, almost none the magnetic flux is emitted to outside the coil antennas 100A and 100B. As a result, the amount of magnetic flux linking with the communication-partner-side antenna is markedly reduced, the coupling coefficient is reduced and the antenna characteristics are degraded. That is, it is preferable that the coil antennas be at least separated from each other.

Second Preferred Embodiment

Figure 14:
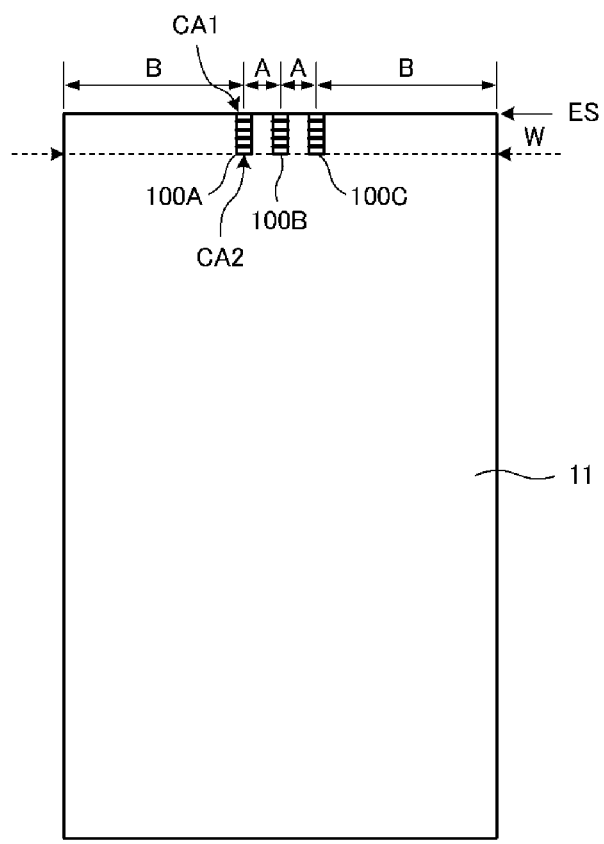
FIG. 14 is a plan view of an antenna device 202 according to a second preferred embodiment of the present invention.

FIG. 14 is a plan view of an antenna device 202A according to a second preferred embodiment of the present invention. In the antenna device 202A of this preferred embodiment, three coil antennas 100A, 100B and 100C are arranged such that first coil opening ends thereof are contiguous with the edge ES of the planar conductor 11. In this example, the width W of the planar conductor preferably is about 60 mm.

Figure 15A:
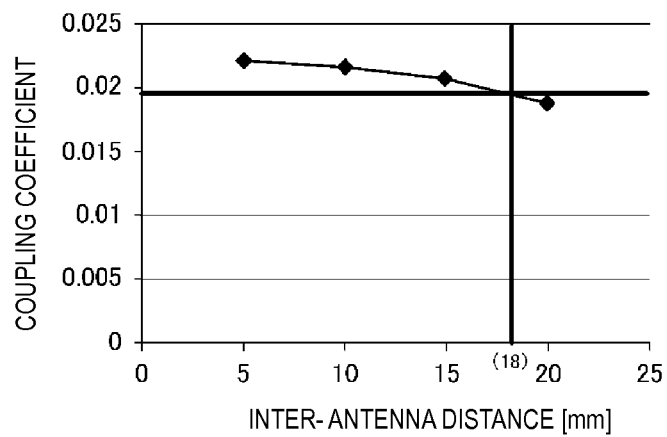
FIG. 15A and FIG. 15B illustrate changes in antenna characteristics that occur when the arrangement positions of three coil antennas 100A, 100B and 100C with respect to a planar conductor 11 illustrated in FIG. 14 are changed.
Figure 15B:
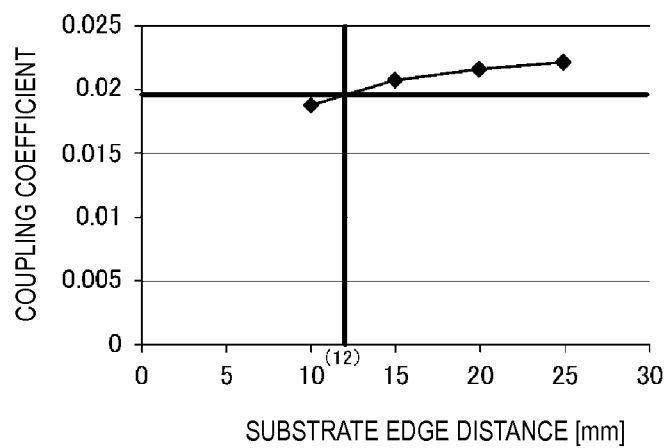

FIGS. 15A and 15B illustrate antenna characteristics when the arrangement positions of the three coil antennas 100A, 100B and 100C with respect to the planar conductor 11 illustrated in FIG. 14 are changed.

FIG. 15A illustrates the relationship between the coupling coefficient and the inter-antenna distance A and FIG. 15B illustrates the relationship between the coupling coefficient and the substrate edge distance B. In FIGS. 15A and 15B, a solid horizontal line is a line representing the coupling coefficient of an antenna device in which a single coil antenna is mounted having a planar surface area equal or substantially equal to the total planar surface area of the coil antennas 100A, 100B and 100C.

As illustrated in FIG. 15A, when the inter-antenna distance A is around 18 mm or less, for example, a higher coupling coefficient is obtained than with an antenna device provided with a coil antenna having three times the planar surface area. Furthermore, as illustrated in FIG. 15B, when the substrate edge distance B is at least 12 mm or more, for example, a higher coupling coefficient is obtained than with an antenna device provided with a coil antenna having three times the planar surface area. That is, it is preferable that the inter-antenna distance A be about $(3/10)W$ or less, for example. In addition, it is preferable that the substrate edge distance B be about $(W-A(N-1))/2$ or more. Here, N is the number of coil antennas and N=3 in this preferred embodiment, for example.

Figure 16:
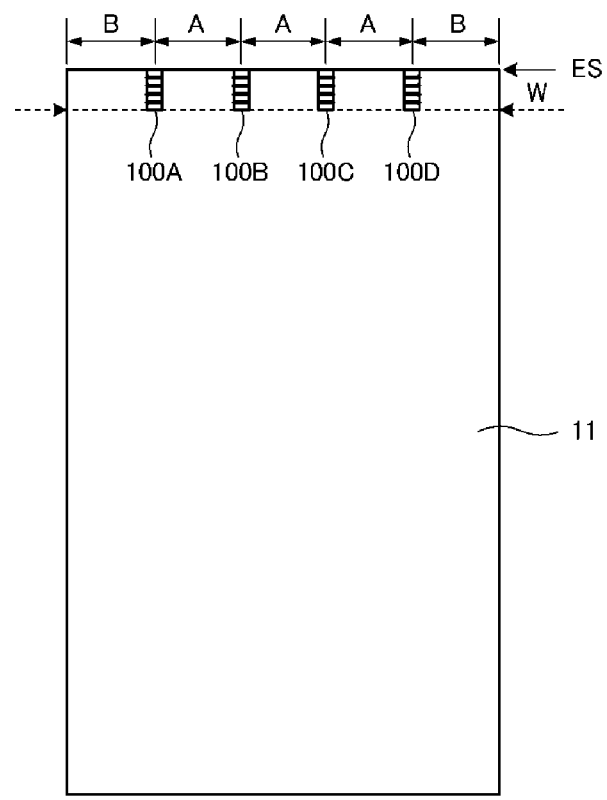
FIG. 16 is a plan view of an antenna device 202B that includes four coil antennas.

As described above, the effect due to the coil antennas being adjacent to each other is not limited to a case in which there are two coil antennas and also applies to a case in which there are three or four or more coil antennas. FIG. 16 is a plan view of an antenna device 202B that includes four coil antennas. In the antenna device 202B of this preferred embodiment, four coil antennas 100A, 100B, 100C and 100D are arranged on the planar conductor 11. The four coil antennas 100A, 100B, 100C and 100D are arranged along one edge ES of the planar conductor 11.

Various connection schemes may be adopted for the coil antennas 100A, 100B, 100C and 100D such as all the coil antennas being connected in parallel, all the coil antennas being connected in series, pairs of parallel-connected coil antennas on either side being connected in series with each other and pairs of serially connected coil antennas on either side being connected in parallel with each other.

Here, the dimensions of the components preferably are as follows, for example.
Inter-antenna distance A=12 mm
Substrate edge distance B=12 mm
Width W of planar conductor 11=60 mm
Therefore, the relationship $A \leq (3/10)W$ holds true.
In addition, $(W-A(N-1))/2=(60-12(4-1))/2=12$
Therefore, $B=(W-A(N-1))/2$.

Thus, preferred embodiments of the present invention are applicable to a case where there are four or more coil antennas and the coupling coefficient is made large in such a case.

In the case where there are a plurality of inter-antenna distances A and these distances are different to each other, among these dimensions, a minimum value of A with which $A \leq (3/10)W$ and a maximum value of A with which $B \leq (W-A(N-1))/2$ preferably are adopted, for example.

Third Preferred Embodiment

Figure 17:
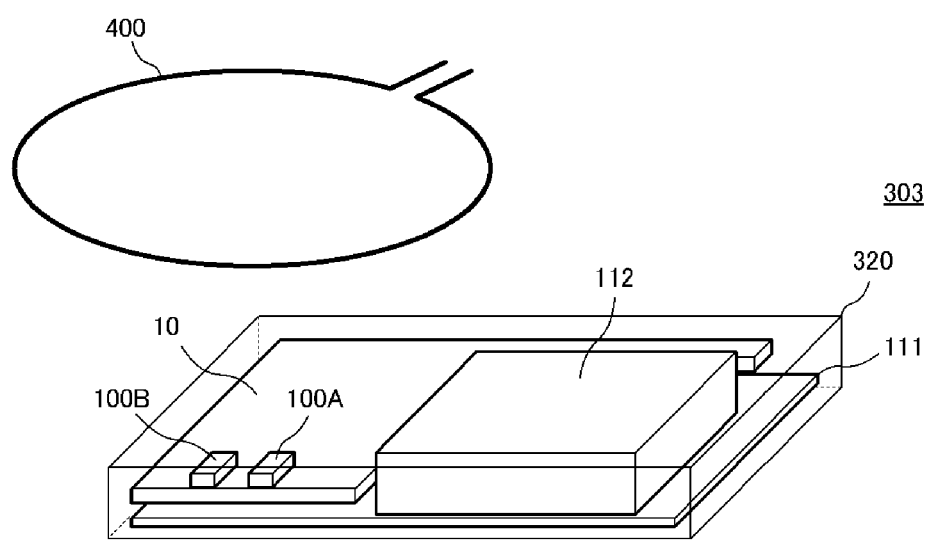
FIG. 17 is a see-through perspective view of a communication terminal device 303 that includes an antenna device according to a third preferred embodiment of the present invention.

FIG. 17 is a see-through perspective view of a communication terminal device 303 that includes an antenna device according to a third preferred embodiment of the present invention. In this communication terminal device 303, for example, a shield conductor 111, which is configured to provide a shielding effect, a main substrate 10 and a battery pack 112 are built into a terminal casing 320. The main substrate 10 preferably includes a multilayer substrate, a ground electrode extending over practically a whole surface thereof and the ground electrode defines a portion of the planar conductor. In addition, the shield conductor 111 and the battery pack 112 also define a portion of the planar conductor. That is, an antenna device includes, for example, the main substrate 10, the coil antennas 100A and 100B, the shield conductor 111 and the battery pack 112.

The coil antennas 100A and 100B are arranged on a back surface side of the terminal casing 320. The shield conductor 111 is arranged behind a display device. The main substrate 10 is a printed wiring board including a rigid resin substrate such as an epoxy resin substrate, has mounted thereon circuit elements that define a driver circuit of the display device, a battery control circuit and so forth, and in addition to the coil antennas 100A and 100B, has circuit elements mounted thereon that define a communication circuit (RF circuit). The communication terminal device 303 is held over a communication-partner-side loop antenna 400 as illustrated in FIG. 17.

Figure 18:
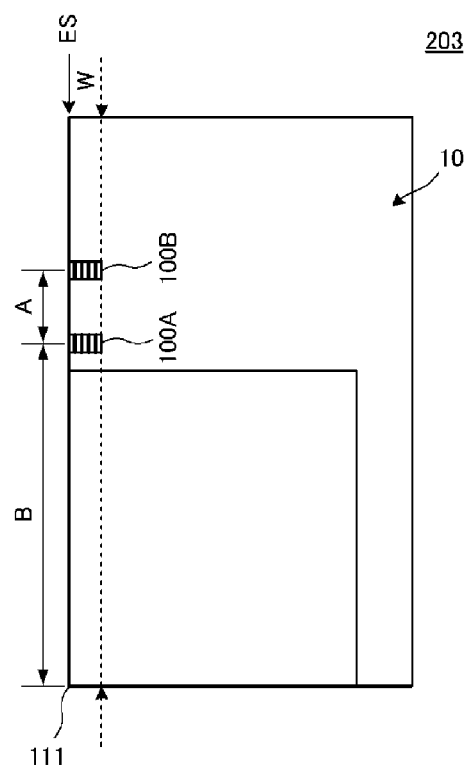
FIG. 18 is a plan view of an antenna device 203 according to the third preferred embodiment of the present invention.

FIG. 18 is a plan view of an antenna device 203 according to the third preferred embodiment. In the antenna device 203 of this preferred embodiment, two coil antennas 100A and 100B are arranged such that first coil opening ends thereof are contiguous with an edge ES of the planar conductor 11. In this example, the width W of the planar conductor preferably is about 100 mm. The coil antennas 100A and 100B cannot be arranged in the center of the width W and therefore the substrate edge distance B is fixed at a distance of about 60.4 mm to the end of the substrate 10, for example. Here, although it may be thought that there are two substrate edge distances B, the longer distance is referred to as the substrate edge distance B.

Figure 19:
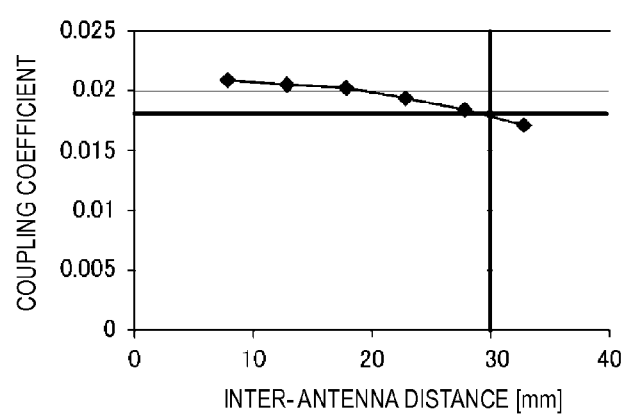
FIG. 19 illustrates changes in antenna characteristics that occur when the arrangement positions of two coil antennas 100A and 100B with respect to a substrate 10 and a shield conductor 111 illustrated in FIG. 18 are changed.

FIG. 19 illustrates changes in antenna characteristics that occur when the arrangement positions of the two coil antennas 100A and 100B with respect to the substrate 10 and the shield conductor 111 illustrated in FIG. 18 are changed.

In FIG. 19, a solid horizontal line is a line representing the coupling coefficient of an antenna device in which a single coil antenna is mounted having a planar surface area equal or substantially equal to the total planar surface area of the coil antennas 100A and 100B.

As illustrated in FIG. 19, when the inter-antenna distance A is around 30 mm or less, for example, a higher coupling coefficient is obtained than with an antenna device provided with a coil antenna having twice the planar surface area. That is, it is preferable that the inter-antenna distance A be generally about (3/10)W or less, for example.

As described above, various preferred embodiments of the present invention are also applicable to a case in which the planar conductor includes a plurality of members. That is, the term "planar conductor" in the description of preferred embodiments of the present invention includes components or portions that act as a magnetism collecting element, components or portions having a function of blocking magnetic flux, and three-dimensional objects. In addition, a ground electrode provided on a plurality of layers inside a multilayer substrate can also define and function as the planar conductor.

Fourth Preferred Embodiment

Figure 20:
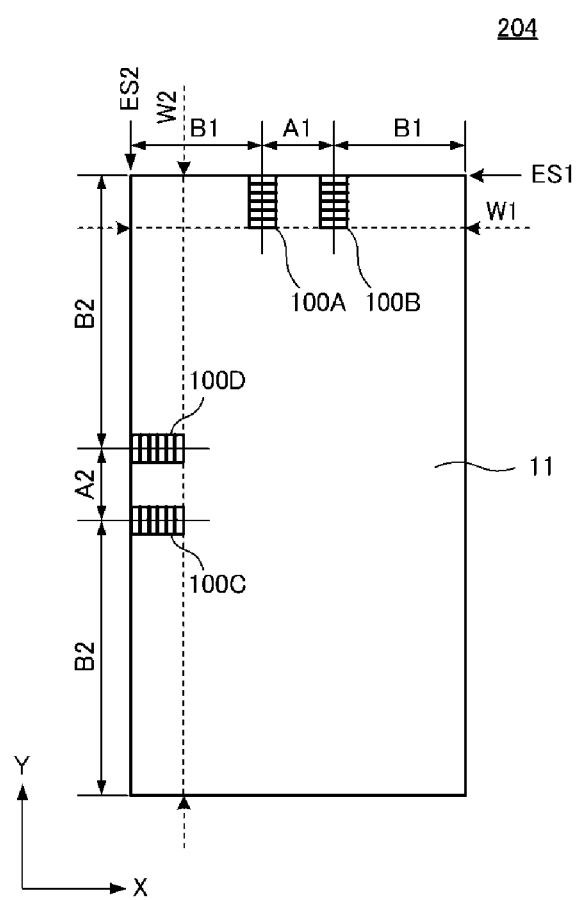
FIG. 20 is a plan view of an antenna device 204 according to a fourth preferred embodiment of the present invention.

FIG. 20 is a plan view of an antenna device 204 according to a fourth preferred embodiment of the present invention. The antenna device 204 of this preferred embodiment includes four coil antennas 100A, 100B, 100C and 100D, and these coil antennas are arranged on the planar conductor 11. The coil antennas 100A and 100B are arranged such that their first coil opening ends are contiguous with an edge ES1 of the planar conductor 11 extending in the X-axis direction. In addition, the coil antennas 100C and 100D are arranged such that their first coil opening ends are contiguous with an edge ES2 of the planar conductor 11 extending in the Y-axis direction. Therefore, the winding axes of the coil antennas extend in two directions, namely, the X axis direction and the Y axis direction.

Various connection schemes may be adopted for the coil antennas 100A, 100B, 100C and 100D such as all the coil antennas being connected in parallel, all the coil antennas being connected in series, pairs of parallel-connected coil antennas on either side being connected in series with each other and pairs of serially connected coil antennas on either side being connected in parallel with each other.

The same positional relationship as in the first preferred embodiment is defined for the two coil antennas arranged contiguous with each of the two edges ES1 and ES2. That is, the following relations are satisfied, where W1 and W2 represent the widths of the planar conductor at lines passing along the coil opening ends, A1 and A2 represent central spacings of the coil antennas, B1 and B2 represent distances from the centers of the coil antennas on the respective ends to the sides of the planar conductor along the lines and N1 and N2 denote the numbers of coil antennas.

$A1 \leq (3/10)W1$ and $(W1-A1(N1-1))/2 \leq B1 \leq W1$ $A2 \leq (3/10)W2$ and $(W2-A2(N2-1))/2 \leq B2 \leq W2$ According to this preferred embodiment, the same effect as in each of the above-described preferred embodiments is obtained for each edge. Specifically, with the above conditional expressions, the coupling coefficient becomes larger than that in the case where one coil antenna having the same or substantially the same area as the two coil antennas is arranged at each of the edges ES1 and ES2. Furthermore, as an additional effect, since the winding axes of the coil antennas extend in at least two directions, magnetic flux oriented in the vertical direction (Y axis direction) and magnetic flux oriented in the horizontal direction (X axis direction) are generated and therefore the reading range is widened. That is, even if the positional relationship with the communication partner is shifted horizontally, coupling takes place with magnetic flux in the vertical direction and even if the positional relationship with the communication partner is shifted vertically, coupling takes place with magnetic flux in the horizontal direction and therefore reading is able to be performed even if a shift has occurred in the vertical or horizontal direction. That is, the readable range is widened vertically and horizontally. In addition, since a plurality of coil antennas are arranged along the respective edges, magnetic flux is widened in the same directions along these edges. Therefore, the readable range is further widened vertically and horizontally.

Fifth Preferred Embodiment

Figure 21:
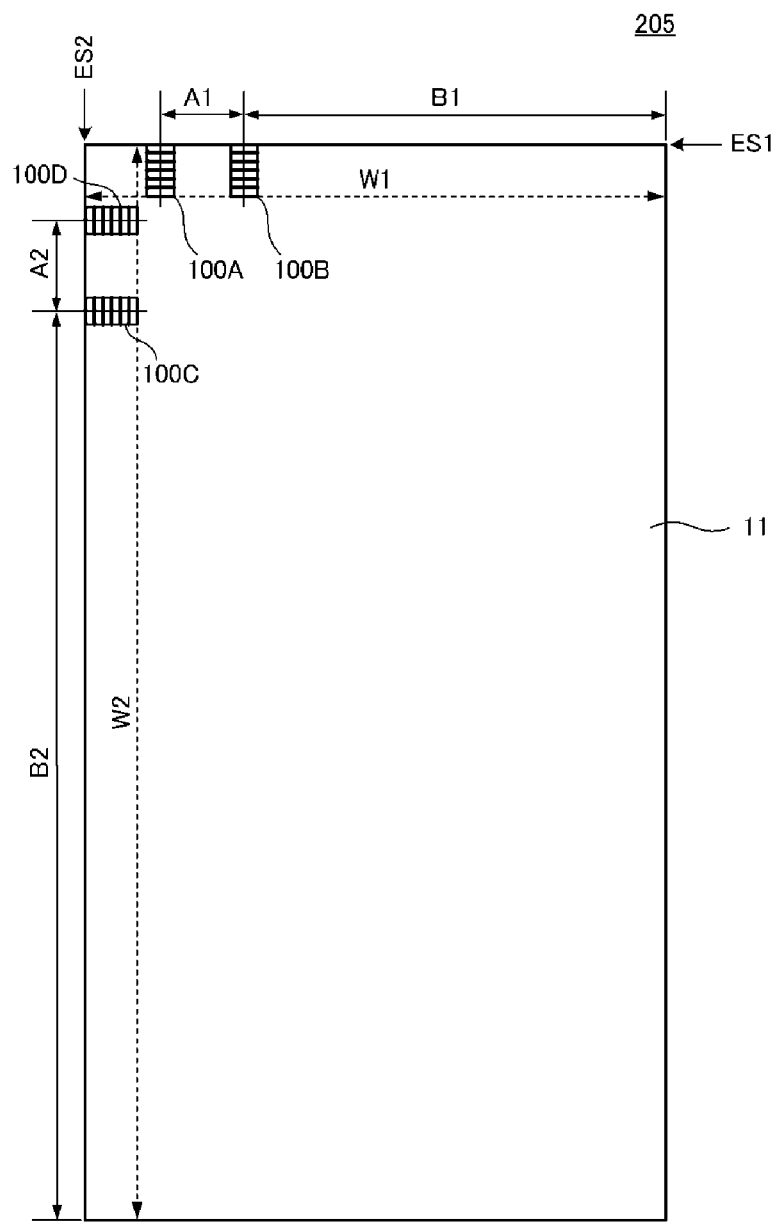
FIG. 21 is a plan view of an antenna device 205 according to a fifth preferred embodiment of the present invention.

FIG. 21 is a plan view of an antenna device 205 according to a fifth preferred embodiment of the present invention. In the antenna device 205 of this preferred embodiment, four coil antennas 100A, 100B, 100C and 100D are arranged on the planar conductor 11. The four coil antennas 100A, 100B, 100C and 100D are arranged unevenly toward one corner of the planar conductor 11 along two adjacent edges ES1 and ES2 of the planar conductor 11.

Various connection schemes may be adopted for the coil antennas 100A, 100B, 100C and 100D such as all the coil antennas being connected in parallel, all the coil antennas being connected in series, pairs of parallel-connected coil antennas on either side being connected in series with each other and pairs of serially connected coil antennas on either side being connected in parallel with each other.

The same positional relationship as in the third preferred embodiment is defined for the two coil antennas arranged contiguous with each of the two edges ES1 and ES2. That is, the following relations are satisfied, where W1 and W2 represent the widths of the planar conductor at lines passing along the coil opening ends, A1 and A2 represent central spacings of the coil antennas, B1 and B2 represent distances from the centers of the coil antennas on the respective ends to the edges of the planar conductor along the lines and N1 and N2 denote the numbers of coil antennas.

$A1 \leq (3/10)W1$ and $(W1-A1(N1-1))/2 \leq B1 \leq W1$ $A2 \leq (3/10)W2$ and $(W2-A2(N2-1))/2 \leq B2 \leq W2$ Two distances from the centers of two coil antennas to the sides of the planar conductor along the lines are selectable but here the longer distances are denoted as B1 and B2.

With this preferred embodiment, the following additional effect is exhibited compared with the case where one coil antenna having the same area as the two coil antennas is arranged along each of the edges ES1 and ES2.

Figure 22A:
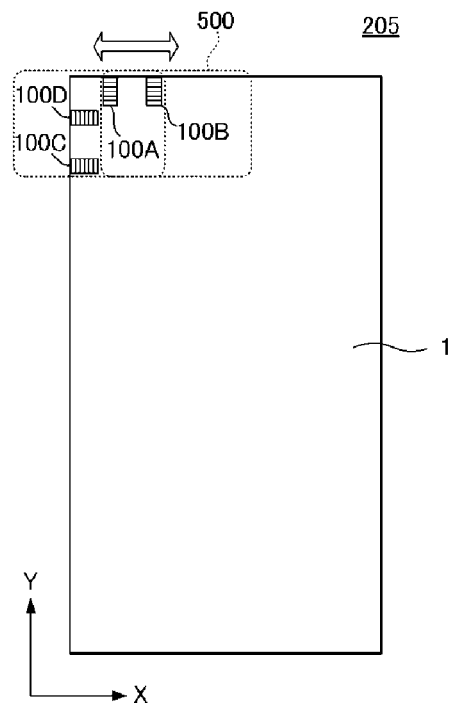
FIG. 22A, FIG. 22B and FIG. 22C are plan views illustrating the positional relationship between the antenna device 205 according to the fifth preferred embodiment of the present invention and an RF tag that is a communication partner.
Figure 22B:
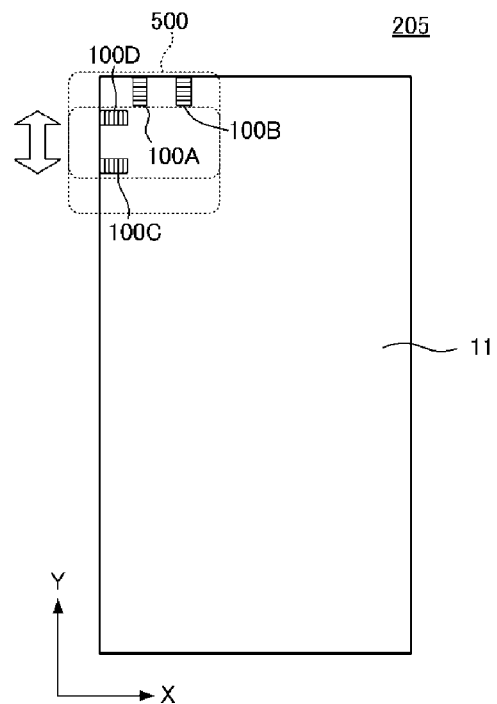
Figure 22C:
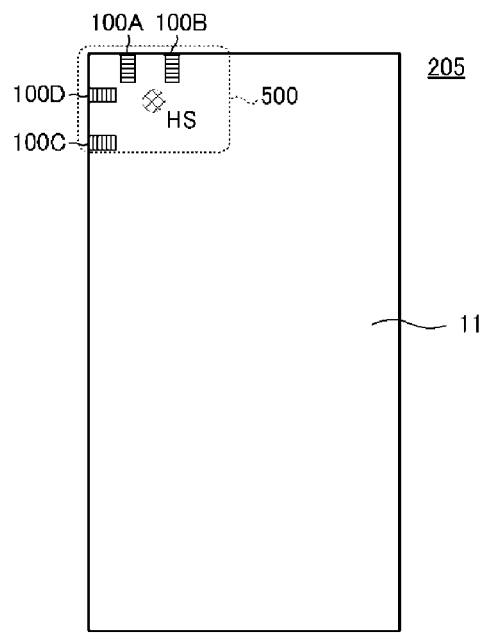

FIGS. 22A, 22B and 22C are plan views illustrating the positional relationship between the antenna device 205 according to this preferred embodiment and a communication partner RF tag 500. Here, the exterior shape of the RF tag 500 is indicated by a broken line. The shape of a coil antenna inside the RF tag 500 is a loop shape extending along the broken line. FIG. 22A illustrates the positional relationship in a case where the RF tag 500 is shifted in the X axis direction with respect to the antenna device 205. In the antenna device 205, the coil antennas 100A and 100B whose winding axes are parallel or substantially parallel to the Y axis direction are arranged along an edge that extends in the X axis direction and therefore the range over which communication is able to be performed has a margin in the X axis direction when RF tag is brought close to the arrangement positions of the coil antennas 100A and 100B of the antenna device 205. That is, communication is able to be performed even if the RF tag 500 is slightly shifted in the X axis direction. In addition, FIG. 22B illustrates the positional relationship in a case where the RF tag 500 is shifted in the Y axis direction with respect to the antenna device 205. In the antenna device 205, the coil antennas 100C and 100D whose winding axes are parallel or substantially parallel to the X axis direction are arranged along an edge that extends in the Y axis direction and therefore the range over which communication is able to be performed has a margin in the Y axis direction when RF tag is brought close to the arrangement positions of the coil antennas 100C and 100D of the antenna device 205. That is, communication is able to be performed even if the RF tag 500 is slightly shifted in the Y axis direction.

FIG. 22C illustrates the positional relationship between a hot spot of the antenna device 205 and the RF tag. Since the coil antennas 100A, 100B, 100C and 100D are located close to a corner of the planar conductor 11, a hot spot HS of the antenna device 205 (region in which coupling between RF tag 500 and coil antennas 100A, 100B, 100C and 100D is strongest) is located close to the corner of the planar conductor 11. At this time, a case is considered in which outer dimensions of the planar conductor 11 are larger than the outer dimensions of the coil antenna of the RF tag 500. If the RF tag 500 is arranged on the hot spot HS in order to perform communication with certainty, the portion of the coil antenna of the RF tag 500 that faces the planar conductor 11 when viewed in plan from a direction perpendicular or substantially perpendicular to a main surface of the planar conductor is comparatively small. As a result, fluctuations in the inductance of and fluctuations in the resonant frequency of an antenna portion of the RF tag 500 due to unwanted coupling between the coil antenna of the RF tag 500 and the planar conductor 11 are significantly reduced or prevented.

Considering a case in which the antenna device 205 is provided in a tablet terminal, the planar conductor 11 corresponds to a ground conductor pattern of a circuit board inside the tablet terminal. If the dimensions of the planar conductor 11 are 250 mm×170 mm and the dimensions of the coil antenna inside the RF tag 500 are 72 mm×42 mm, for example, if the hot spot HS is close to the center of one edge of the planar conductor 11, three sides of the coil antenna of the RF tag 500 are superposed with (close to) the planar conductor 11. In contrast, as illustrated in FIG. 22C, if the hot spot HS is close to a corner of the planar conductor 11, only two edges of the coil antenna of the RF tag 500 are superposed with (close to) the planar conductor 11. As a result, fluctuations in the inductance of and fluctuations in the resonant frequency of an antenna portion of the RF tag 500 due to unwanted coupling between the coil antenna of the RF tag 500 and the planar conductor 11 are significantly reduced or prevented.

Sixth Preferred Embodiment

In a sixth preferred embodiment of the present invention, a number of modifications will be described regarding the shape of the planar conductor and the arrangement of the coil antennas. Various preferred embodiments of the present invention are similarly applicable to these examples as well.

Figure 23A:
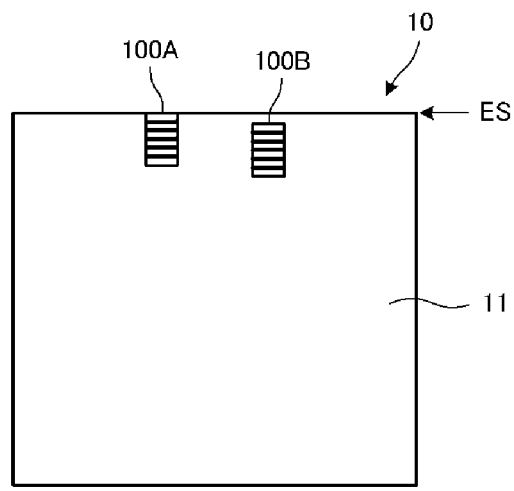
FIG. 23A and FIG. 23B illustrate examples in which positions of first coil opening ends of coil antennas 100A and 100B with respect to an edge ES of a planar conductor 11 are not the same.

FIG. 23A illustrates an example in which the positions of first coil opening ends of the coil antennas 100A and 100B with respect to the edge ES of the planar conductor 11 are not the same. The positions of a plurality of coil antennas may be slightly shifted with respect to the edge ES of the planar conductor 11 in this way.

Figure 23B:
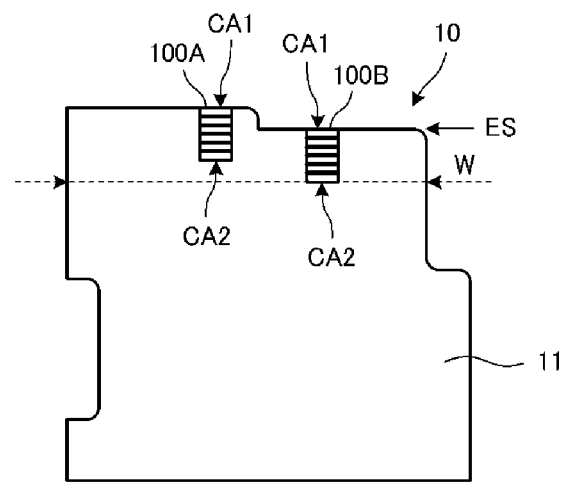

FIG. 23B illustrates an example in which the shape of the edge ES of the planar conductor 11 is not a simple straight line shape. The planar conductor 11 is, for example, a ground electrode provided on the substrate 10. The substrate 10 does not have a simple rectangular shape and therefore the planar conductor need not have a simple rectangular shape. In the example illustrated in FIG. 23B, a width W at a line passing along the second coil opening end CA2 of the coil antenna 100B, which is farther toward the inside of the planar conductor 11 compared with that of the coil antenna 100A, can be treated as the width of the planar conductor.

FIG. 24A illustrates an example in which the coil antennas 100A and 100B protrude from an edge (edge of planar conductor 11) ES of the substrate 10 on which the planar conductor 11 is formed. FIG. 24B illustrates an example in which the first coil opening ends CA1 of the coil antennas 100A and 100B are positioned farther toward the inside than an edge ES1 of the substrate 10 but protrude from an edge ES2 of the planar conductor 11. Thus, the first coil opening ends CA1 of the coil antennas 100A and 100B protrude from an edge of the planar conductor 11 and as a result the magnetism collection effect is high and a high coupling coefficient is obtained over a wide angle.

Figure 25A:
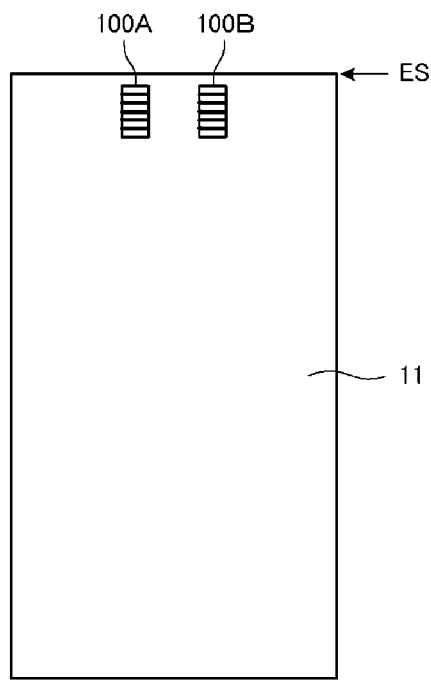
FIG. 25A and FIG. 25B illustrate examples in which coil antennas 100A and 100B are arranged farther toward the inside than an edge ES of a substrate 10 on which a planar conductor 11 is provided.
Figure 25B:
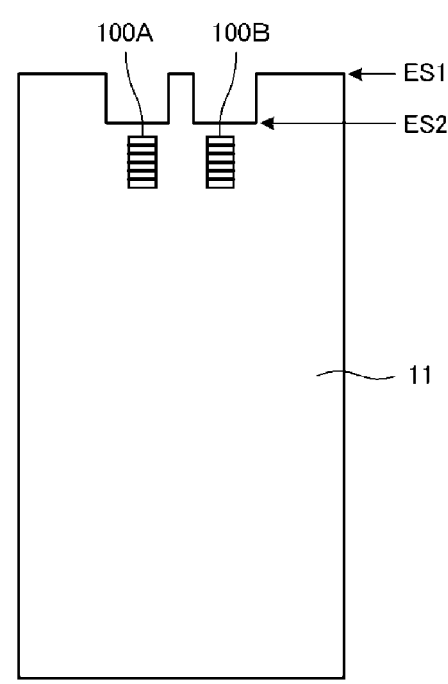

FIG. 25A illustrates an example in which the coil antennas 100A and 100B are arranged farther toward the inside than an edge ES of the substrate 10 on which the planar conductor 11 is provided. FIG. 25B illustrates an example in which the coil antennas 100A and 100B are arranged farther toward the inside than an edge ES2 of the planar conductor 11. Thus, a high magnetism collection effect due to the planar conductor 11 is able to be utilized even if the coil antennas 100A and 100B are arranged slightly farther toward the inside than an edge of the planar conductor 11.

Figure 26A:
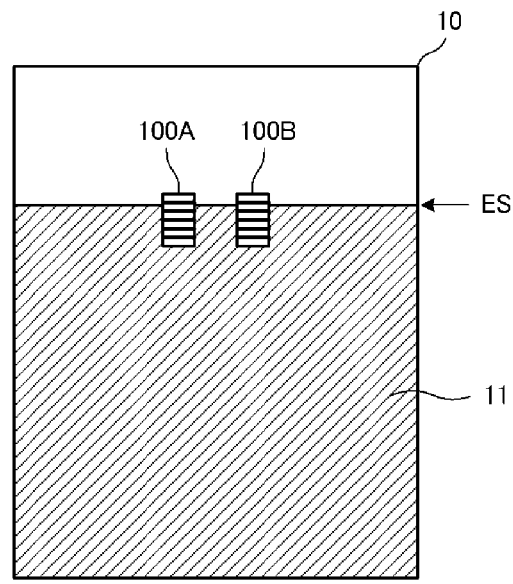
FIG. 26A and FIG. 26B illustrate examples in which coil antennas 100A and 100B protrude from an edge ES of a planar conductor 11, which is ground electrode provided on a substrate 10.
Figure 26B:
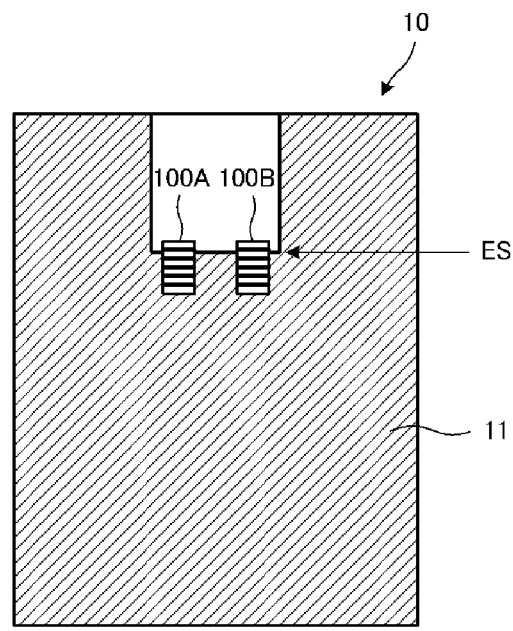

FIGS. 26A and 26B illustrate examples in which the coil antennas 100A and 100B protrude from an edge ES of the planar conductor 11, which is a ground electrode provided on the main substrate 10. Thus, since the coil antennas 100A and 100B protrude from an edge of the planar conductor 11, a high magnetism collection effect is obtained even though the coil antennas 100A and 100B are positioned inside the substrate 10.

Seventh Preferred Embodiment

In a seventh preferred embodiment of the present invention, an antenna device is described in which a plurality of coil antennas are arranged along each of two edges of the planar conductor.

Figure 27A:
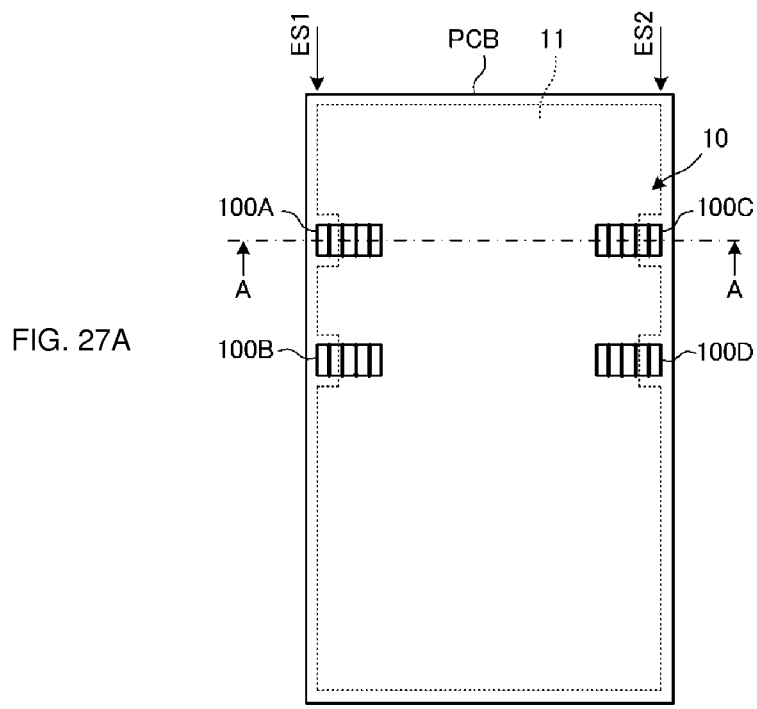
FIG. 27A is a plan view of an antenna device 207 according to a seventh preferred embodiment of the present invention and FIG. 27B is a sectional view of a portion along A-A in FIG. 27A.
Figure 27B:
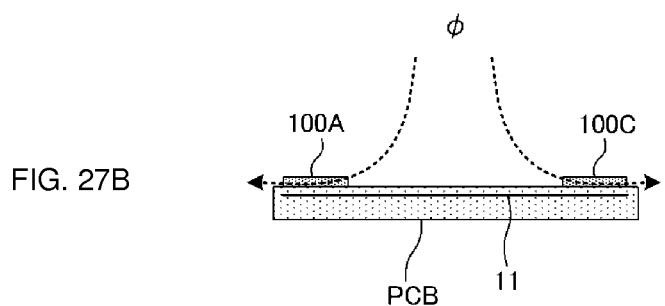
Figure 28A:
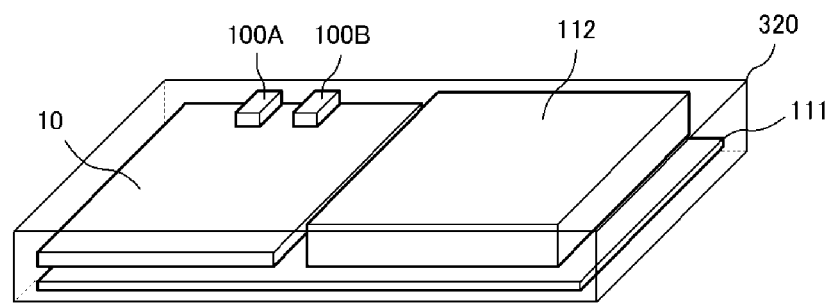
FIGS. 28A to 28D are see-through perspective views of a communication terminal device according to an eighth preferred embodiment of the present invention.
Figure 28B:
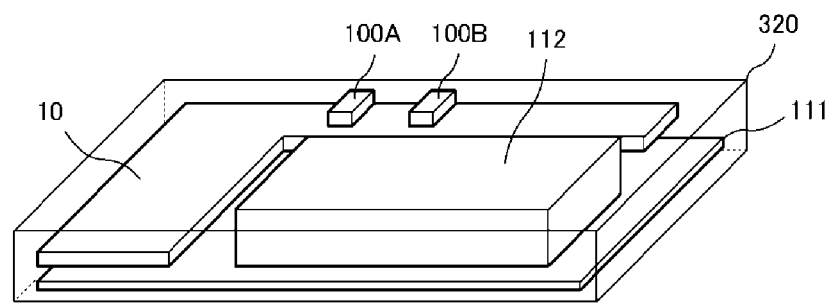
Figure 28C:
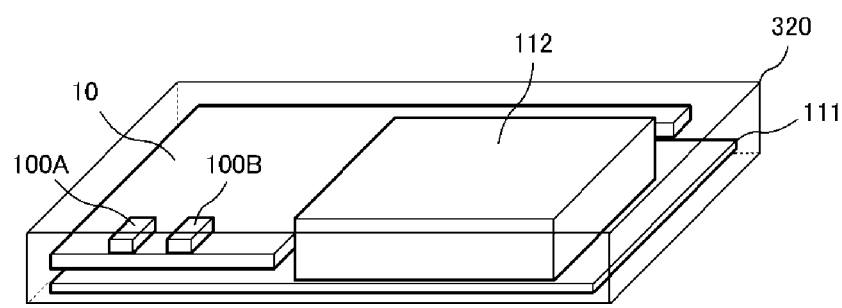
Figure 28D:
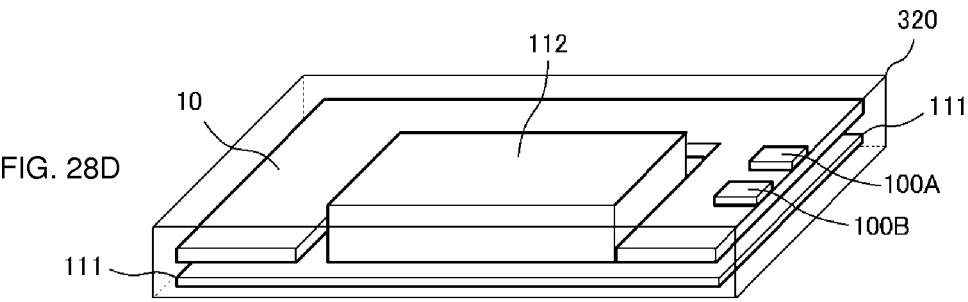

FIG. 27A is a plan view of an antenna device 207 according to the seventh preferred embodiment and FIG. 27B is a sectional view of a portion along A-A in FIG. 27A. The planar conductor 11 is a ground conductor pattern provided on a printed wiring board PCB. The coil antennas 100A and 100B are arranged along a first edge ES1 of the planar conductor 11 and the coil antennas 100C and 100D are arranged along a second edge ES2 of the planar conductor 11.

The coil antenna 100A and the coil antenna 100C, as illustrated in FIG. 27B, are wound and connected such that portions of their magnetic flux in a direction perpendicular or substantially perpendicular to the planar conductor 11 (broken line arrows φ) strengthen each other. The coil antenna 100B and the coil antenna 100D have a relationship in which they are similarly wound and connected. Thus, if the planar conductor 11 is used as a magnetism collection element, the communication range in a direction normal to the printed wiring board PCB is able to be made larger.

Various schemes can be adopted to connect the coil antennas 100A, 100B, 100C and 100D. For example, the coil antennas 100A and 100B are connected in parallel, the coil antennas 100C and 100D are connected in parallel and then these parallel-connection circuits are connected in series with each other. Furthermore, the coil antennas 100A and 100C may be connected in series with each other, the coil antennas 100B and 100D may be connected in series with each other and then these series-connection circuits may be connected in parallel with each other. All four of the coil antennas 100A, 100B, 100C and 100D may be connected in series with each other or all four of the coil antennas 100A, 100B, 100C and 100D may be connected in parallel with each other, but it is preferable to use both a parallel connection and a series connection as described above from the viewpoint of significantly reducing a resistance component.

Eighth Preferred Embodiment

In an eighth preferred embodiment of the present invention, modifications of a structure in which an antenna device is incorporated into the inside of a communication terminal device are described. FIGS. 28A to 28D are see-through perspective views of a communication terminal device. In each of the communication terminal devices, for example, the shield conductor 111, the main substrate 10 and the battery pack 112 are built into the terminal casing 320. A ground electrode extends over practically a whole surface of the main substrate 10 and this ground electrode defines and functions as a portion of the planar conductor. In addition, the shield conductor 111 and the battery pack 112 also define and function as a portion of the planar conductor. That is, an antenna device preferably includes, for example, the main substrate 10, the coil antennas 100A and 100B, the shield conductor 111 and the battery pack 112.

As illustrated in FIGS. 28A to 28D, the coil antennas 100A and 100B are arranged in the vicinity of an edge of the substrate 10.

Preferred embodiments of the present invention can be similarly applied to any electronic appliance in which the antenna device of various preferred embodiments of the present invention is installed such as communication terminal devices such as so-called smart phones and cellular phone terminals, tablet PCs and notebook PCs, wearable terminals such as so-called smart glass and smart watches, games consoles, cameras, and RFID tags such as cards.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
a plurality of coil antennas each including a coil conductor wound around a winding axis; and
a planar conductor that includes at least one edge and that is superposed with at least a portion of each of the coil antennas when viewed in plan; wherein
winding axes of the plurality of coil antennas are parallel or substantially parallel to each other and extend along a surface of the planar conductor, first coil opening ends of coil openings of the coil antennas in a direction in which the winding axes extend are contiguous with the edge, and the coil antennas are connected such that magnetic fluxes generated by the coil antennas are in phase with each other; and
when W represents a width of the planar conductor at a line that passes along second coil opening ends of the plurality of coil antennas on a side opposite to the first coil opening ends and extends in a direction perpendicular or substantially perpendicular to the winding axes and A represents a central spacing of adjacent coil antennas among the plurality of coil antennas, $A \leq (3/10)W$.

2. The antenna device according to claim 1, wherein
a number of the plurality of coil antennas located at the one edge is N, where N is an integer of 2 or more; and
B represents a distance from a center of a coil antenna at one end in a direction in which the N coil antennas are arranged to a side of the planar conductor along the line, $(W-A(N-1))/2 \leq B \leq W$.

3. The antenna device according to claim 1, wherein
the plurality of coil antennas each include a magnetic substance; and
the plurality of coil antennas are spaced apart from each other.

4. The antenna device according to claim 1, wherein a length of the coil antennas in a direction extending along the edge when viewed in plan is smaller than a length of the coil antennas in a direction perpendicular or substantially perpendicular to the edge.

5. The antenna device according to claim 1, wherein the first coil opening ends of the coil antennas are arranged at positions protruding farther toward the outside than the edge of the planar conductor.

6. The antenna device according to claim 1, further comprising a feeder circuit, wherein coil conductors of at least two coil antennas among the plurality of coil antennas are connected in series with the feeder circuit.

7. The antenna device according to claim 1, further comprising a feeder circuit, wherein coil conductors of at least two of the plurality of coil antennas are connected in parallel with the feeder circuit.

8. The antenna device according to claim 1, wherein at least one of the plurality of coil antennas includes a multi-layer body including non-magnetic layers and magnetic layers.

9. The antenna device according to claim 8, wherein the multilayer body includes line-shaped electrodes and via-hole electrodes.

10. The antenna device according to claim 1, wherein at least two of the plurality of coil antennas are connected in series.

11. The antenna device according to claim 1, wherein at least two of the plurality of coil antennas are connected in parallel.

12. The antenna device according to claim 6, wherein the feeder circuit includes a reactance element configured to provide impedance matching and resonant frequency setting of the at least two coil antennas.

13. The antenna device according to claim 7, wherein the feeder circuit includes a reactance element configured to provide impedance matching and resonant frequency setting of the at least two coil antennas.

14. The antenna device according to claim 1, wherein the plurality of coil antennas includes at least three coil antennas arranged such that first coil opening ends thereof are contiguous with the edge of the planar conductor.

15. The antenna device according to claim 1, wherein the plurality of coil antennas includes at least four coil antennas arranged such that first coil opening ends thereof are contiguous with the edge of the planar conductor.

16. The antenna device according to claim 15, wherein the first coil opening ends of at least two of the at least four coil antennas are contiguous with a second edge of the planar conductor.

17. The antenna device according to claim 15, wherein the at least four coil antennas are arranged unevenly toward one corner of the planar conductor along two adjacent edges of the planar conductor.

18. An electronic appliance comprising:
the antenna device according to claim 1; wherein
the coil antennas and the planar conductor are provided inside a casing.

19. The electronic appliance according to claim 18, wherein the electronic appliance is an RF device.

20. The electronic appliance according to claim 18, wherein the electronic appliance is one of a phone, a computer, a wearable terminal, a game console, a camera, and an RFID device.

* * * * *